(12) United States Patent
Kuwayama et al.

(10) Patent No.: US 6,981,579 B2
(45) Date of Patent: Jan. 3, 2006

(54) DYNAMIC DAMPER

(75) Inventors: Naohito Kuwayama, Nagoya (JP); Takashi Hayashi, Komaki (JP)

(73) Assignee: Tokai Rubber Industries, Ltd., Komaki (JP)

( * ) Notice: Subject to any disclaimer, the term of this patent is extended or adjusted under 35 U.S.C. 154(b) by 83 days.

(21) Appl. No.: 10/648,947

(22) Filed: Aug. 26, 2003

(65) Prior Publication Data

US 2004/0041318 A1 Mar. 4, 2004

(30) Foreign Application Priority Data

Aug. 27, 2002 (JP) .......................... 2002-247613
May 28, 2003 (JP) .......................... 2003-151499

(51) Int. Cl.
 *F16F 15/02* (2006.01)
 *G01B 11/28* (2006.01)

(52) U.S. Cl. .................. 188/379; 267/141.1; 464/180
(58) Field of Classification Search ............... 188/379; 267/141.1, 141.2, 141.3, 141.4, 141.7; 74/574; 464/180

See application file for complete search history.

(56) References Cited

U.S. PATENT DOCUMENTS

| | | | | |
|---|---|---|---|---|
| 4,378,865 A | * | 4/1983 | McLean | ............. 188/379 |
| 5,865,429 A | * | 2/1999 | Gautheron | ............. 267/141.7 |
| 6,308,810 B1 | * | 10/2001 | Kuwayama | ............. 188/379 |
| 6,349,918 B1 | * | 2/2002 | Bunker | ............. 248/635 |
| 6,450,487 B1 | * | 9/2002 | Kuwayama | ............. 267/141 |
| 6,550,754 B2 | | 4/2003 | Kuwayama | |
| 2002/0036124 A1 | * | 3/2002 | Kuwayama | ............. 188/141 |

FOREIGN PATENT DOCUMENTS

| JP | 2002-98186 | | 4/2002 |
|---|---|---|---|
| JP | 2002-98186 | * | 5/2002 |

* cited by examiner

*Primary Examiner*—Chris Schwartz
(74) *Attorney, Agent, or Firm*—Beyer Weaver & Thomas LLP

(57) ABSTRACT

A dynamic damper including: a cylindrical metallic mass; a cylindrical fixing member with an inner diameter smaller than that of the metallic mass member; a connecting member connecting the metallic mass member with respect to the fixing member; and a covering member integrally formed with the cylindrical fixing member and the connecting member, and covering the mass member. A plurality of engaging recesses are formed at axial end portions of the mass member to be open in an outer circumferential surface thereof, and a plurality of engaging projections integrally formed with the covering member are held in stable engagement with the engaging recesses, respectively.

8 Claims, 7 Drawing Sheets

DYNAMIC DAMPER

INCORPORATED BY REFERENCE

The disclosure of Japanese Patent Application No. 2002-247613 filed on Aug. 27, 2003 and No. 2003-151499 filed on May 28, 2003, each including the specification, drawings and abstract is incorporated herein by reference in its entirety.

BACKGROUND OF THE INVENTION

1. Field of the Invention

The present invention relates to a dynamic damper that is mounted about and fixed onto an outer circumferential surface of a rotative shaft, such as a drive shaft of an automotive vehicle, in order to attenuate vibration excited in the rotative shaft.

2. Description of the Related Art

Generally, such a dynamic damper includes: a cylindrical metallic mass member; a pair of cylindrical elastic fixing portions disposed on the axially opposite sides of the metallic mass member in a coaxial relationship with the metallic mass member with a given axial spacing therebetween; a pair of elastic connecting portions disposed between and connecting the axially opposite end faces of the metallic mass member and opposing axially inner faces of the elastic fixing portions, respectively; and a thin elastic covering portion covering an inner and outer circumferential surface of the metallic mass member. The fixing portions, the connecting portion and the covering portion are integrally formed as a single rubber elastic body member. The dynamic damper, for example, is mounted about a drive shaft of an automotive vehicle with its elastic fixing portions being press-fitted onto an outer circumferential surface of the drive shaft. When vending, torsional, or other undesirable vibrational loads are caused by a rotation of the drive shaft, and are applied to the dynamic damper mounted about the drive shaft as described above, the dynamic damper is able to absorb or attenuate these undesirable vibrational loads with the help of shear deformations or other deformations caused in the elastic connoting portions by resonance of the metallic mass member with respect to these vibrational loads applied thereto.

Figure 12A:
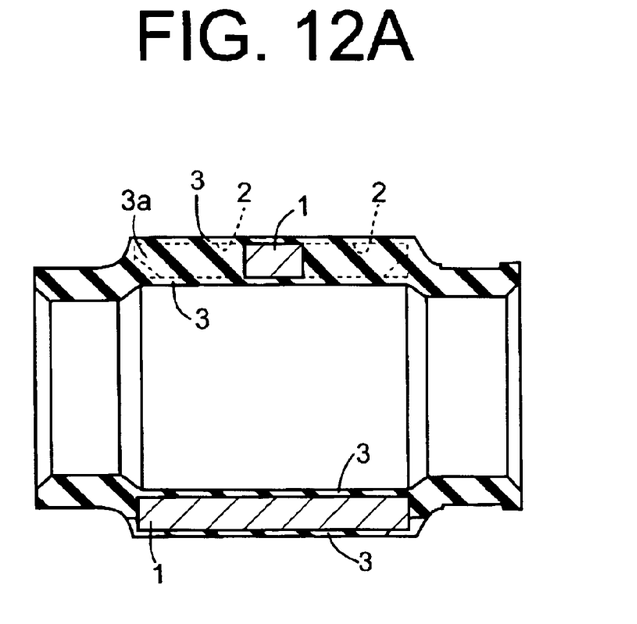
FIG. 12A is an elevational view in axial cross section of a conventional dynamic damper.

In order to provide such a dynamic damper at a relatively low cost, it has been attempt to eliminate an adhesive provided between the metallic mass member and a part of the rubber elastic body member, which part is held in contact with the metallic mass member. However, this attempt has resulted in lowering in a capacity of the rubber elastic body member to hold the metallic mass member. For this reason, when the dynamic damper is subjected to vibration, the metallic mass member is likely to rotate relative to the rubber elastic body member, resulting in undesirable variation in resonance action of the dynamic damper. Thus, the dynamic damper may suffer from deterioration in its vibration damping capacity. To cope with these problems derived from the elimination of the adhesive provided between the metallic mass member and the rubber elastic body member, a variety of measures has been proposed. One example of such measures is disclosed in JP-A-2002-98186 (Page 2 and FIGS. 1 and 3), wherein a plurality of slits 2 are formed at respective circumferential positions of both axial end portions of a cylindrical metallic mass member 1. These slits 2 extend through the wall thickness of the metallic mass member 1 with a given axial length, while being open in axial end faces of the metallic mass member 1, respectively.

Also, these slits 2 are filled with a rubber-covering layer 3 that covers the inner and outer circumferential surfaces of the metallic mass member 1.

Figure 12B:
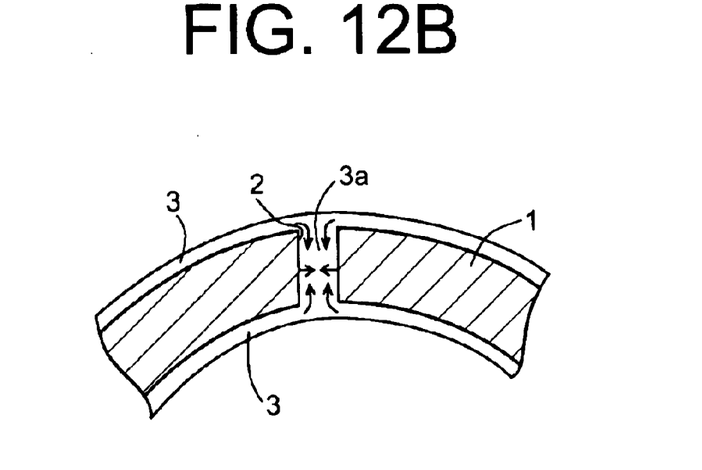
FIG. 12B is an enlarged fragmental view in cross section suitable for explaining a conventional problem.

However, the dynamic damper disclosed in the above-mentioned document may suffer from the following problems. Referring to FIG. 12B, a rubber elastic body undergoes shrinkage when being cooled from a relatively high temperature just after a vulcanization process to a room temperature. As a result, a part 3a of the rubber elastic body as well as the rubber-covering layer 3 covering an inner and an outer circumferential surface of the metallic mass member 1 also undergo shrinkage. In this stage, the rubber elastic body should be elastically deformed in directions as indicated by allows in FIG. 12B, so as to compensate decrease in volume of the part 3a filling the slit 2 caused by the shrinkage, by means of displacement of the covering rubber layer 3 toward the slits 2. However, an amount of displacement of the rubber covering layer is prone to be insufficient to compensate the amount of the shrinkage of the part 3a of the rubber elastic body, thus easily causing a gap or crack formed between the slit 2 and the part 3a of the elastic body. In particular, a radially inner part of the rubber covering layer 3, integrally bonded to a radially inner part of the part 3a, also undergoes shrinkage in itself in a radially inward direction. This makes it difficult for the rubber elastic body to make deformation in the direction required to compensate the volume decrease of the part 3a disposed within the slit 2, likely causing a relatively large gap. When subjected to input vibration, the metallic mass member is prone to rotate relative to the rubber elastic body at the part where the gap is formed, resulting in variation in resonance effect of the dynamic damper. Thus, the dynamic damper may possibly suffer from deterioration in its damping capability. Further, the above-described elastic deformation of the rubber elastic body causes tensile stress or other residual stress in the part 3a disposed within the slit 2 as well as the rubber covering layer 3, possible causing deterioration in durability of the dynamic damper. Furthermore, the slits 2 of the metallic mass member 1 make acute edges, and the edges of the slits 2 repeatedly come into contact with the part 3a of the rubber elastic body that suffers from the residual stress in a tensile direction. Therefore, the rubber covering layer 3a is readily to be damaged, possible causing a difficulty in achieving sufficiently a desired durability of the rubber covering layer 3.

In the light of a design of the dynamic damper, if the metallic mass member is made small in its axial length, the width of the slit is prone to be made small in order to avoid a shortage of the mass due to a wide slit. The metallic mass member is generally formed by forging or sintering of metal, since it is cheap to manufacture. Preferably employed is the method of sintering, since it is simple in manufacturing facility. In the case where the metallic mass member is formed by sintering of metal, the provision of the narrow slits makes it difficult to assure strength of a mold at a part where is shaped to form the narrow slits. It is yet more difficult for forging to form the metallic mass member with the narrow slits. On the other hand, the provision of the wide slits makes it difficult to obtain a sufficient mass of the metallic mass member, inevitably expanding the profile of the metallic mass member, whereby the dynamic damper undesirably needs a large space for installation.

SUMMARY OF THE INVENTION

It is therefore one object of this invention to provide a dynamic damper which is compact in size, and whose rubber elastic body is durable and capable of stably holding a metallic mass member without needing the rubber elastic body and the metallic mass member to be bonded together by means of adhesive.

The above and/or other objects may be attained according to a principle of the invention and at least one of the preferred form of the invention. The following preferred forms of the respective aspects of the invention may be adopted at any possible optional combinations. It is to be understood that the present invention is not limited to the following forms or combinations of these forms, but may otherwise be recognized based on the thought of the present invention that described in the whole specification and drawings or that may be recognized by those skilled in the art in the light of the disclosure in the whole specification and drawings.

The principle of the present invention provides a dynamic damper comprising: (a) a cylindrical metallic mass member including a plurality of engaging recesses formed at least at axially opposite end portions thereof so as to be open in an outer circumferential surface thereof; (b) a cylindrical fixing member of elastic body having an inner diameter smaller than an inner diameter of the metallic mass member; (c) a connecting member of elastic body being adapted to connect the metallic mass member with respect to the fixing member; (d) a covering member of elastic body, being integrally formed with the cylindrical fixing member and the connecting member, and covering the metallic mass member; (e) a plurality of engaging projections projected into and filling approximately completely the plurality of recesses of the metallic mass member, respectively, the engaging projections being integrally formed with the covering member, wherein the connecting member and the covering member being fixed to the metallic mass member without using adhesive, and wherein the dynamic damper is adapted to be disposed about and fixedly mounted on a rotative member such that the metallic mass member surrounds the rotative member with a given gap therebetween, and is elastically connected to the rotative member via the connecting member.

In the dynamic damper constructed according to the first aspect of the invention, the metallic mass member is not bonded to the connecting member and the covering member by means of an adhesive. Instead, the plurality of engaging recesses open in respective circumferential portions of the outer circumferential surface of the metallic mass member are approximately completely filled with the engaging projections integrally formed with the covering member. With the engaging projections being projected into and engaged with the respective engaging recesses, the metallic mass member is fixedly engaged with the covering member so that the metallic mass member is immovable relative to the covering member in its circumferential direction. Moreover, the engaging recesses are arranged to be open in the outer circumferential surface of the metallic mass member and not to reach an inner circumferential surface of the metallic mass member, in other words, are arranged to have floors. In this arrangement, tensile stress exerted on the engaging projections due to shrinkage of the elastic body in the form of the fixing, connecting and covering members after vulcanization of a rubber material for forming the elastic body, is almost only influenced by an outer circumferential portion of the covering member, which covers the outer circumferential surface of the metallic mass member. Accordingly, undesirable occurrence of gaps or cracks between the engaging recesses and the engaging projections is eliminated or minimized, permitting the engaging projections to be engaged in approximately close contact with the engaging recesses, respectively.

In other words, since the entire elastic body undergoes shrinkage in its radially inward direction in its entirety, the engaging projections disposed within the engaging recesses open in the outer circumferential surface of the metallic mass member is easily deformed in a direction to be projected into the engaging recesses. Accordingly, the engaging projections are advantageously held in engagement with the engaging recesses, thus effectively preventing occurrence of the gaps or cracks between the engaging recesses and the engaging recesses. Moreover, since the engaging recesses are not open in the inner circumferential surfaces of the metallic mass member, the engaging projections filling the engaging recesses are less affected by an inner circumferential portion of the covering member, although an inner circumferential portion of the covering member is naturally deformed due to the shrinkage of the elastic body in the radially inward direction, i.e., in a direction away from the metallic mass member. This arrangement further efficiently avoids the occurrence of gaps or cracks between the engaging projections and engaging recesses. As is understood from the above, the engaging projections are free from or less likely to suffer from a problem of residual stress in a tensile direction.

Additionally, an extensive study conducted by the inventors has revealed that a rate of shrinkage of the covering member in the radially inward direction is made large at a radially inner portion rather than a radially outer portion of the covering member. That is, decrease in a radial thickness of the engaging projections leads to decrease in a rate of radial shrinkage of the engaging projections. In the present invention, since the engaging recesses are formed only at the outer circumferential portion of the metallic mass member, the engaging projections filling the engaging recesses are made small in their radial thickness. Thus, tensile stress exerted on the engaging projections due to shrinkage of the elastic body can be effectively minimized in comparison with the conventional dynamic damper as shown in FIG. 12, thus effectively preventing occurrence of the gaps or cracks between the engaging recesses and the engaging recesses.

It should be appreciated that the outer circumferential surface of the metallic mass member is a portion where a distance from a rotation axis of the metallic mass member is maximized, so that the engagement between the covering member and the metallic mass member at this portion, is effective to generate a moment as a restricting force for restricting the rotation of the metallic mass member in its circumferential direction relative to the elastic body member. Thus, the dynamic damper of the present invention can effectively prevent the displacement of the metallic mass member relative to the covering member with relatively small engaging recesses, in comparison with the case where the metallic mass member and the covering layer are engaged together on the inner circumferential surface of the metallic mass member.

Therefore, the dynamic damper according to the principle of the invention is free from or less likely to suffer from the problem of the rotation of the metallic mass member relative to the covering member, upon application of vibrational load, permitting the covering member or other part of the elastic body to stably generate a force for retaining the metallic mass member in position. Further, since the rotation of the metallic mass member is eliminated or minimized, damage of the covering member due to repeated contacts of the edges of the engaging recesses of the metallic mass member with the covering member, thus ensuring high durability of the covering member. Further, the dynamic damper of the present invention ensures sufficient strength of a mold used in a sintered method for manufacturing the metallic mass member. Alternatively, the metallic mass member can be formed by forging.

According to one preferred form of the invention, each of the engaging recesses is of groove shape and extends in an axial direction of the metallic mass member with a substantially constant cross sectional shape.

According to another preferred form of the invention, the fixing member is coaxially disposed within a bore of the metallic mass member such that the fixing member and the metallic mass member are radially opposed to each other with a given gap therebetween, and the connecting member is disposed between the fixing member and the metallic mass member so as to radially extend over the given gap for elastically connecting the fixing member and the metallic mass member. In this arrangement, the principle of the present invention is effectively realized in a dynamic damper where a single connecting member is disposed within a bore of the metallic mass member.

According to yet another preferred form of the invention, the fixing member comprises a pair of fixing portions disposed on and spaced away from axially opposite sides of the metallic mass member, respectively, each being in a coaxial relationship with the metallic member, and the connecting member comprises a pair of connecting portions disposed between the axially opposite end portions of the metallic mass member and axially inner end portions of the fixing portions, respectively, and connect the axially opposite end portions and the axially inner end portions together over their entire circumferences, the dynamic damper being adapted to be disposed about and fixedly mounted on the rotative member such that the metallic mass member surrounds the rotative member with a given gap therebetween over an entire circumference thereof, and the pair of fixing portions are press fitted onto the rotative member. In this arrangement, the principle of the present invention is effectively realized in a dynamic damper where a pair of connecting portions extends axially outwardly and radially inwardly from the axially opposite end portions of the metallic mass member, respectively.

According to still another preferred form of the invention, the engaging recesses are formed at the axially opposite end portions of the metallic mass member, but not formed at axially intermediate portions of the metallic mass member. In this arrangement, the engaging recesses are only formed at the outer circumferential portion of the axially opposite end portions of the metallic mass member, making it possible to minimize undesirable decrease in the mass of the metallic mass member, while ensuring a desired circumferential dimension of each of the engaging recesses. Also, the prevention of the mass reduction of the metallic mass member permits the dynamic damper to be compact in size. This arrangement makes it easy to form the engaging opening in the outer circumferential surface of the metallic mass member. Described in detail, the engaging recesses can be formed at the axially opposite end portions of the metallic mass member by punching at the same time when a central portion of a cylindrical work piece is punched out to form the cylindrical metallic mass member.

Preferably, a number and circumferential positions of the plurality of the recesses are made identical in both of the axially opposite end portions of the metallic mass member so that the engaging recesses formed at one of the axially opposite end portions of the metallic mass member are opposed to the recesses formed at an other one of the axially opposite end portions, respectively. In this arrangement, tensile stress exerted on the engaging projections filling the engaging recesses through the outer circumferential portion of the covering member are made equal in the axial direction of the metallic mass member, thereby eliminating or minimizing torsional stress in the covering member. Thus, the covering member can desirably exhibit a metallic mass member retaining effect in good balance.

Still preferably, each of the plurality of recesses measures 2 mm long or more and 1 mm thick or more. If the axial length of the engaging recess is less than 2 mm, the engaging projections is likely to be removed from the engaging recesses, when the dynamic damper is press fitted onto the rotative shaft, thus interfering the process of mounting the dynamic damper onto the rotative shaft. On the other hand, if the thickness of the engaging recess is less than 1 mm, the engagement between the engaging recesses and the engaging projections become ineffective to prevent rotation of the metallic mass member relative to the covering member.

According to further preferred form of the invention, each of the plurality of recess is open in a corresponding one of axially opposite end faces of the metallic mass member, and has a sloped floor whose diameter is gradually decreases in an axially outward direction. In the event where the metallic mass member is formed by forging, this arrangement makes it easy to release the forging from a mold, so that the metallic mass member of the present dynamic damper can be manufactured in cheap and with high reliability.

BRIEF DESCRIPTION OF THE DRAWINGS

The forgoing and/or other objects features and advantages of the invention will become more apparent from the following description of a preferred embodiment with reference to the accompanying drawings in which like reference numerals designate like elements and wherein.

DETAILED DESCRIPTION OF PREFERRED EMBODIMENTS

Figure 1:
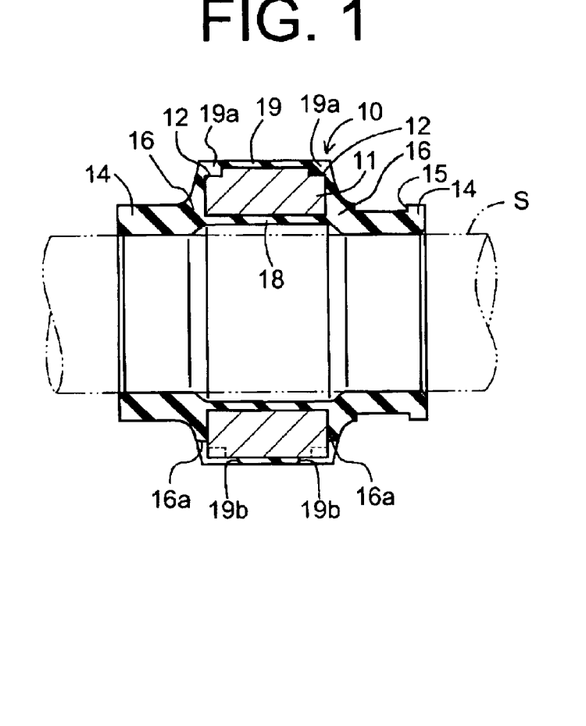
FIG. 1 is an elevational view in axial cross section of a dynamic damper constructed according to a first embodiment of the invention, taken along line 1—1 of FIG. 2.
Figure 2:
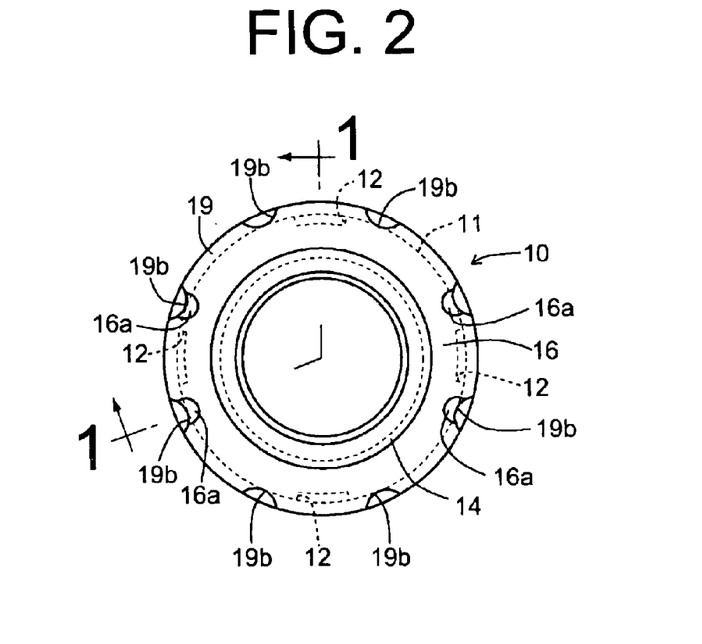
FIG. 2 is a side elevational view of the dynamic damper of FIG. 1.

Referring first to FIGS. 1 and 2, shown is a dynamic damper 10 constructed according to a first embodiment of the invention. The dynamic damper 10 is adapted to be mounted onto a rotative shaft, e.g., a drive shaft S in the present embodiment, in order to attenuate vibrations excited therein.

The dynamic damper 10 includes: a cylindrical metallic mass member 11; a cylindrical fixing member in the form of a pair of cylindrical fixing portions 14 of rubber elastic body, which have an inner diameter smaller than that of the metallic mass member 11, and are disposed on the axially opposite sides of the metallic mass member 11 in a coaxial relationship with the metallic mass member 11 with a given axial spacing therebetween; a connecting member in the form of a pair of cylindrical connecting members 16 of rubber elastic body, disposed between and elastically connecting the axially opposite end faces of the metallic mass member 11 and opposing axially inner faces of the fixing portions 14, respectively; and a thin covering member including an inner and an outer covering layer 18, 19, which covers an outer surface of the metallic mass member 11. The fixing, connecting and covering members 14, 16, 18 are integrally formed as a single rubber elastic body.

Figure 3:
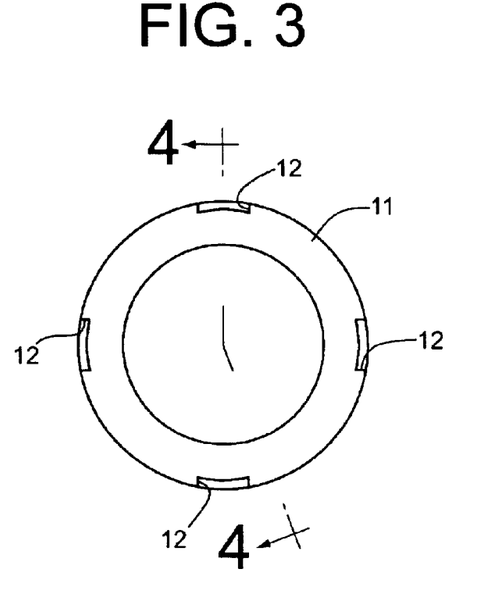
FIG. 3 is a side elevational view of a metallic mass member used in the dynamic damper of FIG. 1.
Figure 4:
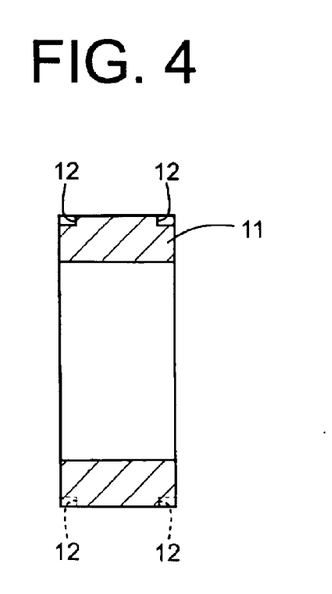
FIG. 4 is a cross sectional view taken along line 4—4 of FIG. 3.

As shown in FIGS. 3 and 4, the metallic mass member 11 is a cylindrical metal member that has, on the both axial end portions thereof, a plurality of engaging recesses 12 situated at respective circumferential positions, which are equally spaced apart from one another in a circumferential direction of the metallic mass member 11, and are identical in the both axial end portions. Therefore, the engaging recesses 12 on the one axial end portion of the metallic mass member 11 are opposed to the engaging recesses 12 on the other axial end in an axial direction of the metallic mass member 11. Each engaging recess 12 is open in an outer circumferential surface as well as the corresponding axial end face of the metallic mass member 11, and extends in an axially inward direction from the corresponding end faces of the metallic mass member 11, with a rectangular shape in transverse cross section. Preferably, each recess 12 measures 2 mm axial length or more and 1 mm thick or more, more preferably 4.5 mm axial length or more and 2 mm thick or more. The number of the engaging recesses 12 may be suitably determined, and three or more engaging recesses 12 are formed at each axial end portion of the metallic mass member 11, preferably. It is also possible to situate the circumferential positions of the engaging recesses 12 differently in the circumferential and axial directions, between the both axial end portions of the metallic mass member 11.

The metallic mass member 11 may be formed by sintering, cool or hot forging, rolling press or other possible methods. Generally, employed is a sintering or forging method for the sake of a cheap manufacturing cost thereof. The sintering method is preferably employed, since it is simple in facility and permits a more cheap manufacturing cost. The metallic mass member 11 may be selected from sintered metals of pure iron type, iron-carbon type, iron-cupper type, and the like, depending upon practical conditions or the like. On the other hand, a variety of cool and hot forgings, e.g., carbon steel, may be employed for the metallic mass member 11. In order to enhance bonding strength between the metallic mass member 11 and the elastic body forming the fixing, connecting and covering members 14, 16, 18, a forging subjected to a scale removal treatment, e.g., a shot blasting, may be preferably employed.

The metallic mass member 11 is covered at its inner and outer circumferential surfaces by means of the inner and outer covering layers 18, 19 that are held in close contact with the inner and outer circumferential surfaces with no adhesive interposed therebetween. The outer covering layer 19 of the covering member has a plurality of engaging projections 19, each projecting into and filling the corresponding engaging recess 12. The inner covering layer 18 of the covering member has a diameter that is made larger by a few millimeters than that of the drive shaft S.

The pair of fixing portions 14 have a shape of thick-walled cylinder whose inner diameter is larger by 1 mm or so than that of the drive shaft S. An annular groove 15 is formed onto an outer circumferential surface of one of the fixing members 14, e.g., the right hand one as seen in FIG. 1, so as to receive a retainer band of ring shape (not shown). The pair of connecting members 16 are adapted to connect the axially opposite end faces of the metallic mass member 11 and opposing axially inner portions of the fixing members 14, respectively. Each connecting member 16 has a funnel shape in a horizontal attitude so that a diameter of the connecting member 16 gradually increases in an axially inward direction. Axially inner end portions of the connecting members 16 are integrally formed with and connected to the inner and outer covering layers 18, 19 covering the inner and outer circumferential surfaces of the metallic mass member 11, but not bonded by means of adhesive to the axially opposite end faces of the metallic mass member 11.

The pair of fixing portions 14, the pair of connecting portions 16 and the covering member 18 may be integrally formed by vulcanizing a rubber material within a mold cavity of a mold (not shown) in which the metallic mass member 11 is preset in position, thereby providing the dynamic damper 10. In this regards, the metallic mass member 11 is not subjected to an adhesive treatment, e.g., adhesion application. In order to place the metallic mass member 11 in position in the mold cavity, the metallic mass member 11 may be supported at each of axially opposite end portions thereof by means of eight side-face support projections, and four end-face support projections. The eight side-face support projections are formed on and projected from respective portions of a mold-cavity defining-surface of the mold, which define the axially opposite end portions of the metallic mass member 11 such that the eight side-face support projections are equally spaced away from each other. Among the eight side-face support portions, mutually adjacent two diametrically opposite ones are contiguous to the four end-face support projections adapted to support each of the axially opposite end faces of the metallic mass member 11. Due to the presence of the eight side-face support projections, each of axially opposite end portions of the outer circumferential portion of the covering member 18 are formed with eight outer recesses 19b at corresponding eight circumferential locations. Likewise, due to the presence of the four end-face support projections, each of the connecting portions 16 is formed with four outward recesses 16a being contiguous with four of the eight outer recesses 19b.

Referring back to FIG. 1, the dynamic damper 10 of construction as described above, is mounted about the drive shaft S coated by a press-aiding liquid, by press-fitting the dynamic damper 10 onto the drive shaft S manually or by using a jig, so that the both fixing portions 14 are press-fitted and firmly fixed onto the drive shaft S. With the dynamic damper 10 mounted about the drive shaft S as described above, a gap of a few millimeters is formed between the inner covering layer 18 of the covering member and an outer circumferential surface of the drive shaft S. The outer circumferential surface of the drive shaft S is also away from an inner circumferential surface of the connecting members 16 axially extending with a funnel shape in a horizontal attitude, by a given distance.

In this state, the metallic mass member 11 is elastically supported on the drive shaft S by means of the fixing portions 14 and the connecting portions 16. When the drive shaft S is rotated and undesirable vibrations, such as bending or torsional vibrations are exerted on the dynamic damper 10, the pair of connecting portions 16 undergo shear deformation due to resonance effect caused by vibration of the metallic mass member 11, so that the dynamic damper 10 can absorb and attenuate these undesirable vibrations.

In the dynamic damper 10 constructed as described above, the metallic mass member 11 is not bonded by means of adhesive to the connecting member 16 and the covering member 18. Instead, the present dynamic damper 10 is provided at its both axial end portions with the plurality of engaging recesses 12 each open in the outer circumferential surface and the corresponding end faces of the metallic mass member 11, while extending axially inwardly from the corresponding end face, and the plurality of engaging projections 19a formed on the outer covering layer 19 of the covering member 17 project into and fill the plurality of engaging recesses 12, respectively. Thus, the engaging projections 19a of the outer covering layer 19 project into the engaging recesses 12 so that the metallic mass member 11 and the inner and outer covering layers 18, 19 are held in close contact and engaged with each other.

Further, the engaging recesses 12 are formed only at the outer circumferential side of the axially opposite end portions of the metallic mass member 11 in the present dynamic damper 10. In this arrangement, only the outer circumferential portion of the covering member 18 affects on tensile stress exerted on the engaging projections 19 within the engaging recesses 12 due to shrinkage of the rubber elastic body after vulcanization of a rubber material for forming the elastic body, thus minimizing tensile deformation of the engaging projections 19a filling the engaging recesses 12. Accordingly, the occurrence of a gap or a crack formed between the engaging projection 19a and the engaging recess 12 is effectively restricted or prevented, permitting the engine engaging projections 19 and the engaging recesses 12 to be engaged together with both surfaces being held in close contact with each other.

In the event where the dynamic damper 10 is subjected to vibration, surely prevented is a rotation of the metallic mass member 11 in its circumferential direction relative to the connecting portions 16 and the covering member, i.e., the inner and outer covering layer 18, 19, making it possible for the covering member to exhibit a force to stably retain the metallic mass member 11 in its original position. For this advantage, the dynamic damper 10 can exhibit a sufficient damping effect. Further, this elimination or limitation of the rotation of the metallic mass member 11 relative to the connecting member 16 and the inner and outer covering layers 18, 19 is effective to prevent the outer covering layer 19 of the covering member from being damaged by edge portions of the engaging recesses 12 repeatedly come into contact therewith, ensuring high durability of the outer covering layer 19 of the covering member.

According to the present embodiment, the engaging recesses 12 are needed only to be formed at outer circumferential side of the axially opposite end portions of the metallic mass member 11. This feature of the present embodiment makes it possible to obtain a sufficient circumferential width of each recess 12, while avoiding undesirable decrease in mass of the metallic mass member 11, and to enhance strength of a mold that is used for molding the metallic mass member 11 by sintering, or alternatively to mold the metallic mass member 11 by forging. Also, since a reduction of the mass of the metallic mass member 11 is restricted in comparison with the conventional dynamic dampers, undesirable enlargement of the metallic mass member 11 is no longer needed, thus permitting the dynamic damper 10 to be compact in size.

Further, the same number, i.e., the four engaging recesses 12 are formed in each of the axially opposite end portions of the metallic mass member 11, and the circumferential positions of the four engaging recesses 12 in one of the end portions of the metallic mass member 11 are made identical with that in the other so that the four recesses on one side are axially opposed to the four recesses on the other side, respectively. This arrangement is effective to equalize in the axial direction of the metallic mass member 11 tensile stress applied through the outer covering layer 19 to the engaging projections 19a filling the engaging recesses 12, making it possible to prevent occurrence of stress in a torsional direction in the outer circumferential portion of the covering member 18. As a result, the dynamic damper 10 of the present embodiment can ensure a sufficient holding of the metallic mass member 11 by means of the outer covering layer 19 of the covering member in good valance. Yet further, since the inner and outer covering layers 18, 19 of the covering member as well as the pair of connecting portions 16 are not bonded by means of an adhesive to the metallic mass member 11, an adhesion treatment applied to the metallic mass member 11 is no longer needed, making it possible to simplify the steps of manufacturing the dynamic damper 10, and to reduce the cost of manufacture of the dynamic damper 10.

Figure 5:
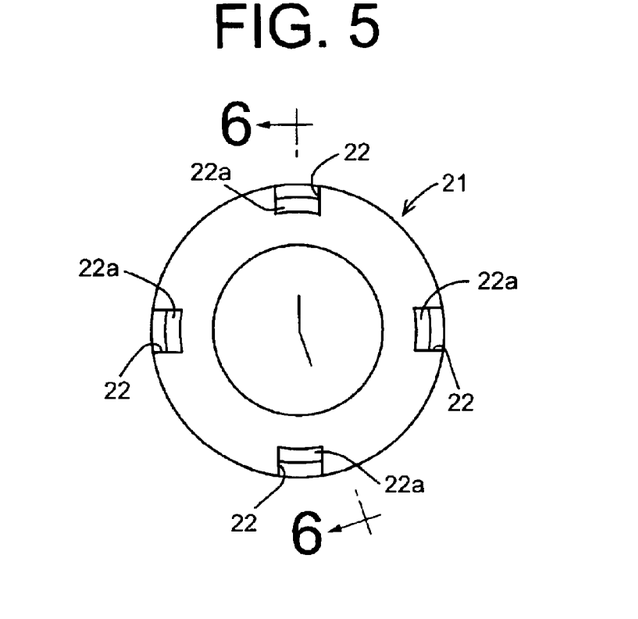
FIG. 5 is a modification of a metallic mass member usable in a dynamic damper of the invention.
Figure 6:
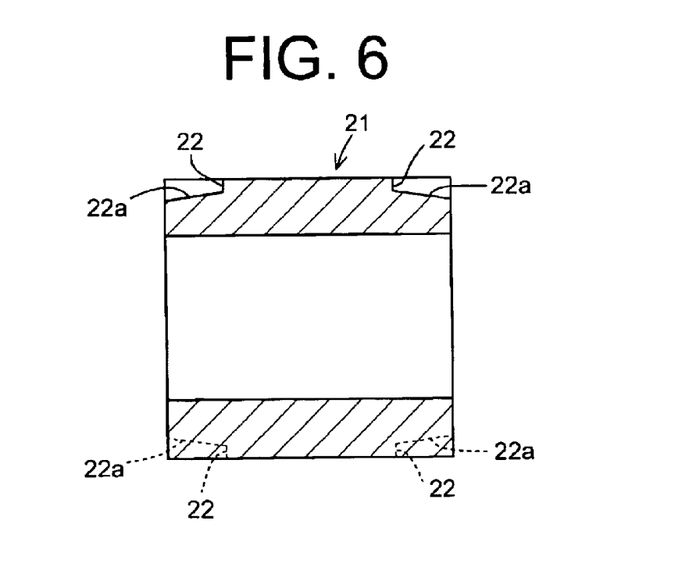
FIG. 6 is a cross sectional view taken along line 6—6 of FIG. 5.

Referring next to FIGS. 5 and 6, shown is another example of a metallic mass member 21 employable in a dynamic damper of the present invention. The metallic mass member 21 is a cylindrical metal member having a plurality (e.g., four) of the recesses 22 at each of opposite axial end portions thereof. The four recesses 22 are equally spaced apart from one another in the circumferential direction of the metallic mass member 21, like in the metallic mass member 11 in the dynamic damper 10. Each recess 22 has a generally rectangular shape in transverse cross section, and a floor 22a of the recess 22 is sloped so that a diameter of the floor 22a gradually decreases in an axially outward direction. In the case where the metallic mass member 21 is formed by forging, the sloped floor 22a of each recess 22 may facilitate a mold releasing process in the forging, so that the metallic mass member 21 can be formed by forging with a relatively cheap manufacturing cost, and with high reliability. It should be appreciated that a variety of configurations may be applied to the floors 22a of the recesses 22, but not limited to a flat surface.

While the presently preferred embodiment of this invention has been described above in detail for the illustrative purpose only, it is to be understood that the present invention is not limited to the details of the illustrated embodiments, but may be otherwise embodied.

Figure 7:
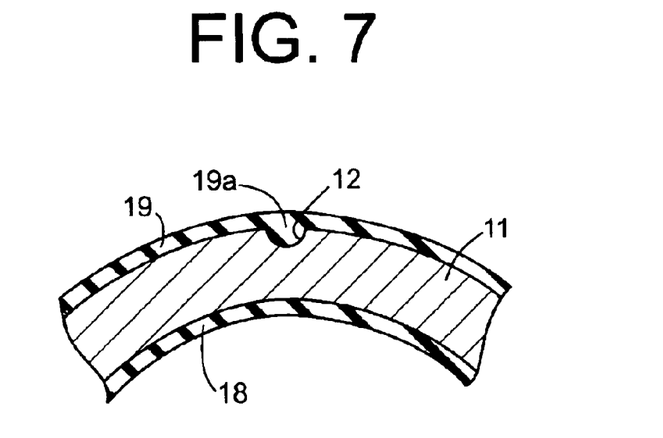
FIG. 7 is an enlarged fragmental view in cross section showing one modification of a groove formed onto the metallic mass member of FIG. 3.
Figure 8:
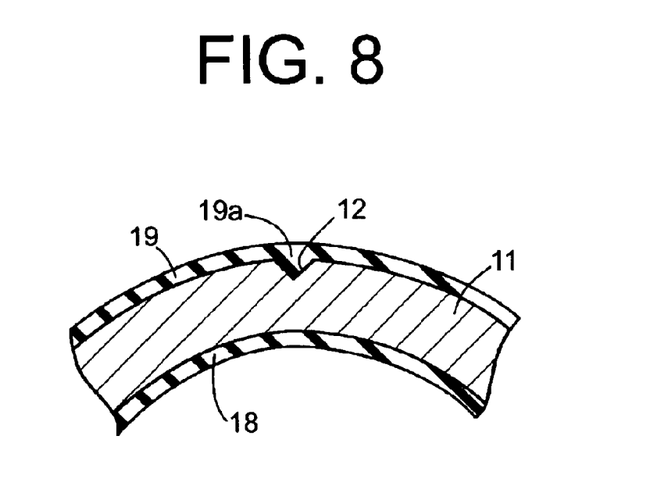
FIG. 8 is an enlarged fragmental view in cross section showing another modification of the groove formed onto the metallic mass member of FIG. 3.
Figure 9:
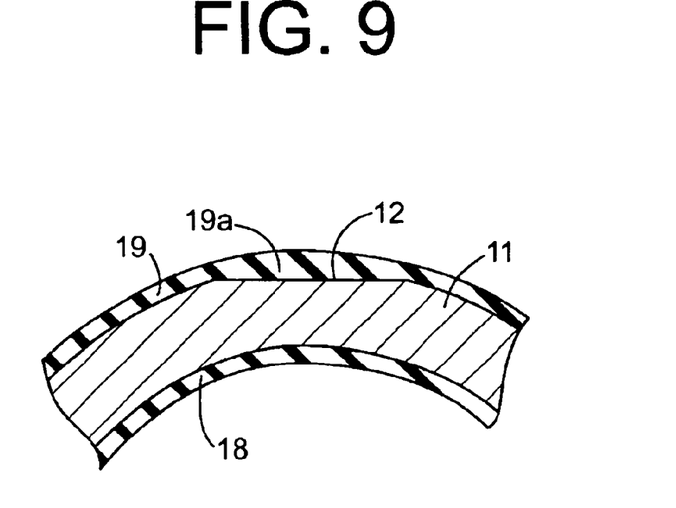
FIG. 9 is an enlarged fragmental view in cross section showing yet another modification of the groove formed onto the metallic mass member of FIG. 3.
Figure 10:
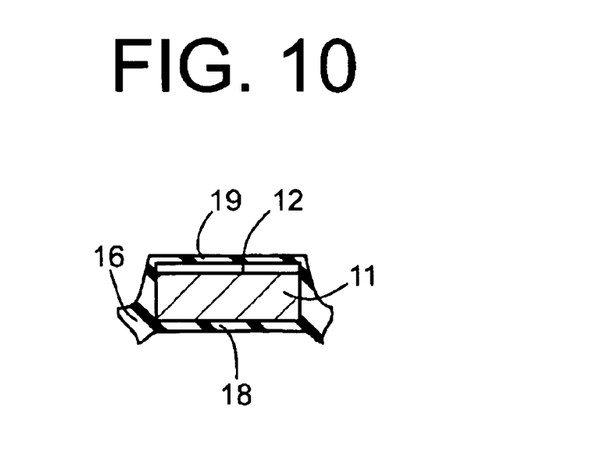
FIG. 10 is a fragmental view in cross section showing still another modification of the groove formed onto the metallic mass member of FIG. 3.

For instance, while each recess 12 has a generally rectangular shape in transverse cross section in the illustrated embodiment, each recess 12 may have a variety of shapes in transverse cross section, which include a semi-circular shape, a cutout shape and a depressed shape, as shown in FIGS. 7–9, respectively. Further, the recessed portion 12 may extend over an entire axial length of the metallic mass member 11 as shown in FIG. 10.

Figure 11:
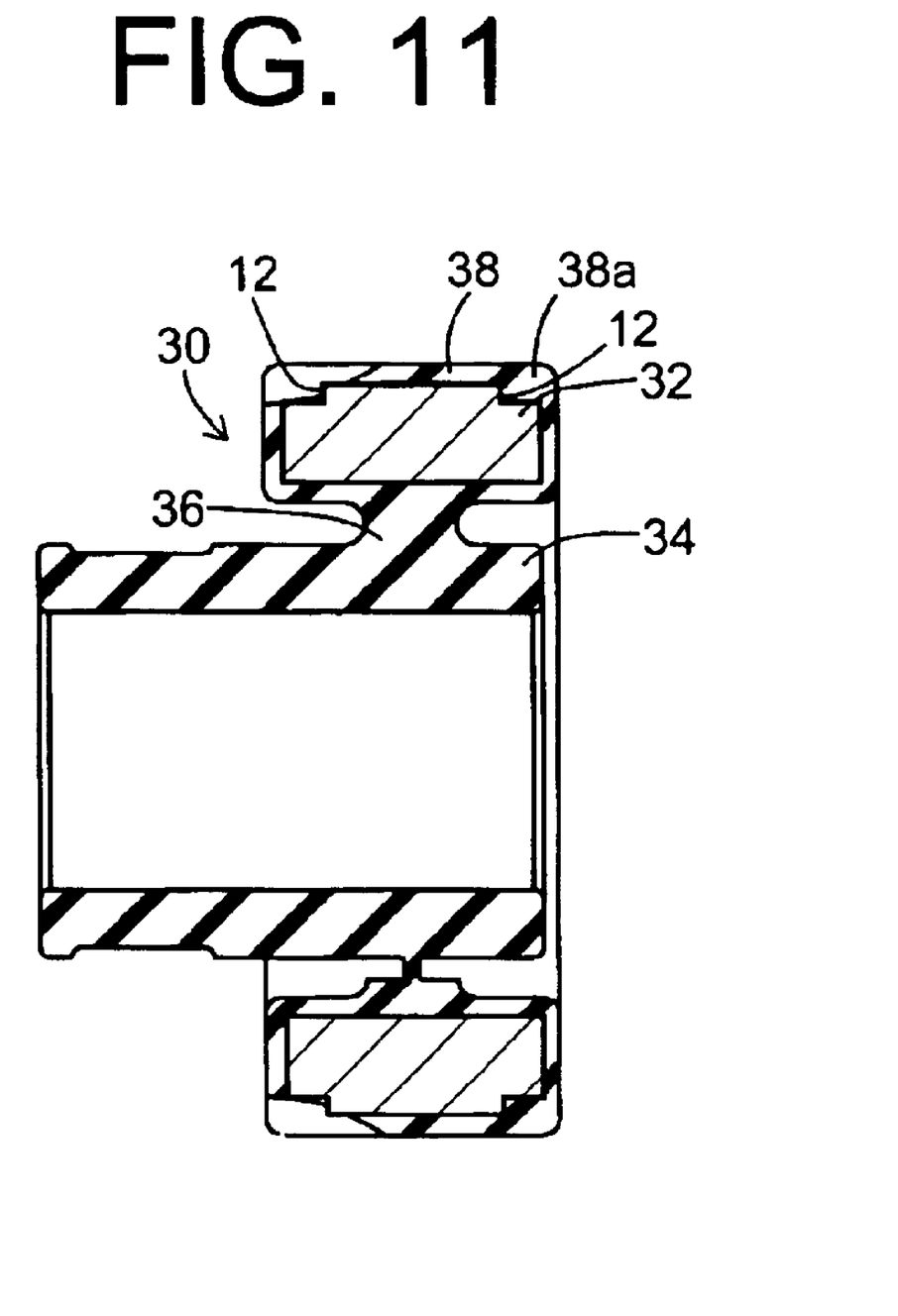
FIG. 11 is an elevational view in axial cross section of a dynamic damper constructed according to a second embodiment of the invention.

The principle of the present invention can also be applied to dynamic damper of various types, other than that of the illustrated embodiment. FIG. 11 shows another type of dynamic damper 30 to which the principle of the present invention is applied. The dynamic damper 30 includes: a cylindrical metallic mass member 32; a cylindrical fixing member 34 of elastic body, which is coaxially disposed within a bore of the metallic mass member 32 such that the fixing member 34 and the metallic mass member 32 are radially opposed to each other with a given gap therebetween; a connecting member 36 of elastic body disposed between the fixing member 34 and the metallic mass member 32 so as to extend radially over the given gap for elastically connecting the fixing member 34 and the metallic mass member 32; and a covering member 38 of elastic body for covering an outer surface of the metallic mass member 32 substantially entirely. Like the illustrated embodiment, the fixing, connecting and covering members 34, 36, 38 are integrally formed as a single rubber elastic body.

Like the metallic mass member 11 in the illustrated embodiment, the metallic mass member 32 has a plurality of engaging recesses 12 formed at axially opposite end portions of the outer circumferential surfaces of the metallic mass member 32. These engaging recesses 12 are substantially completely filled with a plurality of engaging projections 38a integrally formed with an outer circumferential portion of the covering member 38. The engaging projections 38a are held in close contact and fixedly engaged with the engaging recesses 12 as a result of vulcanization of a rubber material within a mold in which the metallic mass member 32 is preset. Thus, the dynamic damper 30 constructed according to the second embodiment can prevent undesirable rotation of the metallic mass member 32 relative to the covering member 38 with high stability, thereby exhibiting a desired damping effect with high reliability, without needing that the metallic mass member 32 and the covering member 38 are bonded together by means of adhesive, like in the dynamic damper 10 according to the first embodiment.

It is also to be understood that the present invention may be embodied with various other changes, modifications and improvements, which may occur to those skilled in the art, without departing from the spirit and scope of the invention defined in the following claims.

What is claimed is:

1. A dynamic damper comprising:
    a cylindrical metallic mass member including a plurality of engaging recesses formed at least at axially opposite end portions thereof so as to be open in an outer circumferential surface thereof;
    a cylindrical fixing member of an elastic body having an inner diameter smaller than an inner diameter of said metallic mass member;
    a connecting member of said elastic body being adapted to connect said metallic mass member with respect to said fixing member;
    a covering member of said elastic body being integrally formed with said cylindrical fixing member and said connecting member, and covering said metallic mass member; and
    a plurality of engaging projections projected into and filling approximately completely said plurality of recesses of the metallic mass member, respectively, said engaging projections being integrally formed with said covering member,
    wherein said connecting member and said covering member being fixed to said metallic mass member without using adhesive,
    wherein said dynamic damper is adapted to be disposed about and fixedly mounted on a rotative member as a damping object such that said metallic mass member surrounds the rotative member with a given gap therebetween, and is elastically connected to the rotative member via said connecting member, and
    wherein said connecting member, said covering member and said engaging projections are directly formed onto said metallic mass member through vulcanization of a rubber material for forming thereof so that said plurality of engaging projections are held in contact and fixedly engaged with said plurality of engaging recesses by utilizing shrinkage of said covering member in a radially inward direction thereof.

2. A dynamic damper according to claim 1, wherein each of said engaging recesses is of groove shape and extends in an axial direction of said metallic mass member with a substantially constant cross sectional shape.

3. A dynamic damper according to claim 1, wherein said fixing member is coaxially disposed within a bore of said metallic mass member such that said fixing member and said metallic, mass member are radially opposed to each other with a given gap therebetween, and said connecting member is disposed between said fixing member and said metallic mass member so as to radially extend over said given gap for elastically connecting said fixing member and said metallic mass member.

4. A dynamic damper according to claim 1, wherein said fixing member comprises a pair of fixing portions disposed on and spaced away from axially opposite sides of said metallic mass member, respectively, each being in a coaxial relationship with said metallic member, and said connecting member comprises a pair of connecting portions disposed between said axially opposite end portions of said metallic mass member and axially inner end portions of said fixing portions, respectively, and connect said axially opposite end portions and said axially inner end portions together over their entire circumferences, said dynamic damper being adapted to be disposed about and fixedly mounted on the rotative member such that said metallic mass member surrounds the rotative member with a given gap therebetween over an entire circumference thereof, and said pair of fixing portions are press fitted onto the rotative member.

5. A dynamic damper according to claim 1, wherein said engaging recesses are formed at said axially opposite end portions of said metallic mass member, but not formed at axially intermediate portions of said metallic mass member.

6. A dynamic damper according to claim 5, wherein a number and circumferential positions of said plurality of said recesses are made identical in both of said axially opposite end portions of said metallic mass member so that said recesses formed at one of said axially opposite end portions of said metallic mass member are opposed to said recesses formed at an other one of said axially opposite end portions, respectively.

7. A dynamic damper according to claim 5, wherein each of said plurality of recesses measures 2 mm long or more and 1 mm thick or more.

8. A dynamic damper according to claim 1, wherein each of said plurality of recess is open in a corresponding one of axially opposite end faces of said metallic mass member, and has a sloped floor whose diameter is gradually decreases in an axially outward direction.

* * * * *